(12) United States Patent
Inukai

(10) Patent No.: US 9,118,252 B2
(45) Date of Patent: Aug. 25, 2015

(54) SWITCHING POWER SOURCE, POWER-SUPPLY SYSTEM AND IMAGE FORMING APPARATUS

(71) Applicant: BROTHER KOGYO KABUSHIKI KAISHA, Nagoya-shi, Aichi-ken (JP)

(72) Inventor: Katsumi Inukai, Iwakura (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/040,009

(22) Filed: Sep. 27, 2013

(65) Prior Publication Data

US 2014/0186067 A1 Jul. 3, 2014

(30) Foreign Application Priority Data

Dec. 28, 2012 (JP) ................. 2012-288202

(51) Int. Cl.
*G03G 15/00* (2006.01)
*H02M 3/335* (2006.01)
*H02M 1/36* (2007.01)
*H02M 1/00* (2007.01)

(52) U.S. Cl.
CPC ........... *H02M 3/33507* (2013.01); *G03G 15/80* (2013.01); *H02M 1/36* (2013.01); *H02M 3/33523* (2013.01); *H02M 2001/0006* (2013.01)

(58) Field of Classification Search
CPC ............. G03G 15/80; H02M 3/33507; H02M 3/33523; H02M 1/36; H02M 2001/0006
USPC ........ 399/88; 363/21.04, 21.07, 21.08, 21.15, 363/21.16
See application file for complete search history.

(56) References Cited

U.S. PATENT DOCUMENTS

| 4,058,758 A | * | 11/1977 | Peterson ...................... 363/80 |
| 4,755,922 A | * | 7/1988 | Puvogel .................. 363/21.16 |
| 5,416,689 A | * | 5/1995 | Silverstein et al. ........ 363/56.01 |
| 5,424,933 A | * | 6/1995 | Illingworth ............... 363/21.02 |
| 5,880,942 A | * | 3/1999 | Leu ................................ 363/49 |

(Continued)

FOREIGN PATENT DOCUMENTS

| EP | 2 450 750 A2 | 9/2012 |
| EP | 2 451 067 A2 | 9/2012 |

(Continued)

OTHER PUBLICATIONS

Extended European Search Report issued in corresponding European Patent Application No. 13186173.4, mailed Jun. 3, 2015.

*Primary Examiner* — David Bolduc
(74) *Attorney, Agent, or Firm* — Merchant & Gould PC

(57) ABSTRACT

A switching power source includes: a transformer; a semiconductor switching element that is provided at a primary side of the transformer; a rectifying-and-smoothing circuit that is provided at a secondary side of the transformer; a switching controller configured to perform a switching control to turn on-and-off the semiconductor switching element, wherein the switching controller comprises: a stoppage circuit configured to perform a stoppage process to stop the switching control when a first-level control signal is input, a restart circuit configured to restart the switching control when a second-level control signal different in its level from the first-level control signal, and a limiting circuit configured to limit, at the time of a start-up of the switching power source, a performance of the stoppage process performed by the stoppage circuit until an output voltage of the switching power source increases to a target voltage.

14 Claims, 10 Drawing Sheets

(56) References Cited

U.S. PATENT DOCUMENTS

| | | | |
|---|---|---|---|
| 5,914,538 A | 6/1999 | Kurosawa et al. | |
| 6,088,243 A | 7/2000 | Shin | |
| 6,104,622 A | 8/2000 | Shin | |
| 6,728,117 B2* | 4/2004 | Schemmann et al. | 363/21.12 |
| 6,952,355 B2* | 10/2005 | Riggio et al. | 363/21.15 |
| 7,161,815 B2* | 1/2007 | Mori | 363/21.12 |
| 7,355,867 B2* | 4/2008 | Shuey | 363/56.11 |
| 7,577,003 B2* | 8/2009 | Nakamura | 363/21.12 |
| 7,719,860 B2* | 5/2010 | Usui | 363/21.12 |
| 7,746,672 B2* | 6/2010 | Nishikawa | 363/21.16 |
| 7,957,162 B2* | 6/2011 | Choi et al. | 363/21.13 |
| 2002/0089862 A1* | 7/2002 | Amei | 363/21.07 |
| 2004/0145924 A1* | 7/2004 | Jang et al. | 363/20 |
| 2005/0078492 A1* | 4/2005 | Takahashi | 363/21.15 |
| 2008/0259659 A1* | 10/2008 | Choi et al. | 363/50 |
| 2009/0237050 A1* | 9/2009 | Yamada et al. | 323/282 |
| 2010/0135050 A1 | 6/2010 | Sonobe | |
| 2010/0244804 A1* | 9/2010 | Zong et al. | 323/299 |
| 2011/0096572 A1* | 4/2011 | Liang et al. | 363/21.12 |
| 2011/0103103 A1* | 5/2011 | Zhan et al. | 363/21.15 |
| 2011/0175587 A1* | 7/2011 | Hosotani | 323/283 |
| 2012/0027447 A1* | 2/2012 | Mukaibara | 399/88 |
| 2012/0027448 A1* | 2/2012 | Mukaibara | 399/88 |
| 2012/0049823 A1* | 3/2012 | Chen | 323/282 |
| 2012/0113685 A1 | 5/2012 | Inukai | |
| 2012/0114363 A1 | 5/2012 | Inukai | |
| 2012/0250365 A1* | 10/2012 | Matsumoto | 363/21.15 |
| 2013/0057875 A1* | 3/2013 | Hotogi et al. | 358/1.1 |
| 2013/0108303 A1* | 5/2013 | Samejima et al. | 399/88 |
| 2013/0134892 A1* | 5/2013 | Kado et al. | 315/206 |
| 2013/0164016 A1* | 6/2013 | Inukai | 399/88 |
| 2013/0257409 A1* | 10/2013 | Komiya | 323/311 |

FOREIGN PATENT DOCUMENTS

| | | |
|---|---|---|
| JP | H07-087734 A | 3/1995 |
| JP | H11-103541 A | 4/1999 |
| JP | 2000-270546 A | 9/2000 |
| JP | 2002-125368 A | 4/2002 |
| JP | 2005-218168 A | 8/2005 |
| JP | 2012-105378 A | 5/2012 |

* cited by examiner

SWITCHING POWER SOURCE, POWER-SUPPLY SYSTEM AND IMAGE FORMING APPARATUS

CROSS-REFERENCE TO RELATED APPLICATION

This application claims priority from Japanese Patent Application No. 2012-288202 filed on Dec. 28, 2012, the entire subject matter of which is incorporated herein by reference.

TECHNICAL FIELD

This disclosure relates to a technology for suppressing a malfunction of a power supply.

BACKGROUND

There is a technology for switching a switching power source between an output mode and an output stop mode by using a control pulse signal outputted from a control device.

SUMMARY

In the configuration for switching a mode by using a control pulse signal, when noise enters thereto, there is a possibility that the mode of a switching power source is switched due to an erroneous detection. The background art employs a configuration in which the contents of the mode setting of the switching power source are stored and the stored contents are compared to an actual mode. If the stored contents do not match the actual mode, it is restored to the original mode having already been set, by re-outputting the control pulse signal.

In this case, however, since there is a need to store the mode setting, extra memories are further consumed, and since a process for performing only the mode recovery is required, processing load of a control device becomes great.

This disclosure provides at least a control method of a switching power source that is low in a malfunction due to noise as compared to a control method by a control pulse signal.

This disclosure discloses a switching power source including: a transformer; a semiconductor switching element that is provided at a primary side of the transformer; a rectifying-and-smoothing circuit that is provided at a secondary side of the transformer; a switching controller configured to perform a switching control to turn on-and-off the semiconductor switching element. The switching controller comprises: a stoppage circuit configured to perform a stoppage process to stop the switching control when a first-level control signal is input, a restart circuit configured to restart the switching control when a second-level control signal different in its level from the first-level control signal, and a limiting circuit configured to limit, at the time of a start-up of the switching power source, a performance of the stoppage process performed by the stoppage circuit until an output voltage of the switching power source increases to a target voltage.

According to this configuration, the switching power source is controlled by the level of a control signal. For this reason, a malfunction due to noise is small as compared to the control system by a pulse signal.

Also, since a limiting circuit restricts an operation of a stoppage circuit until an output voltage of the switching power source becomes a target voltage, it is possible to reliably start the switching power source without stopping the switching control because the stoppage circuit is started immediately after the power is turned on.

A power-supply system may include the above-described switching power source; and a control device configured to be operated by receiving power from the switching power source The control device transmits a switching signal to the switching controller of the switching power source to switch a level of the control signal, thereby switching a mode of the switching power source between an output mode that is in an output state, in which the switching controller performs the switching control, and an output stop mode that is in an output stop state, in which the switching controller stops the switching control.

According to this configuration, it is possible to switch the switching power source between the output mode and the output stop mode.

The power-supply system disclosed by the present specification can be applied to an image forming apparatus including a printing unit that performs a printing process.

According to this disclosure, it is possible to suppress the malfunction of at least the power-supply system and the switching power source.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Embodiment

A first embodiment of this disclosure will be described with reference to FIGS. 1 to 5.

1. Description of Printer

Figure 1:
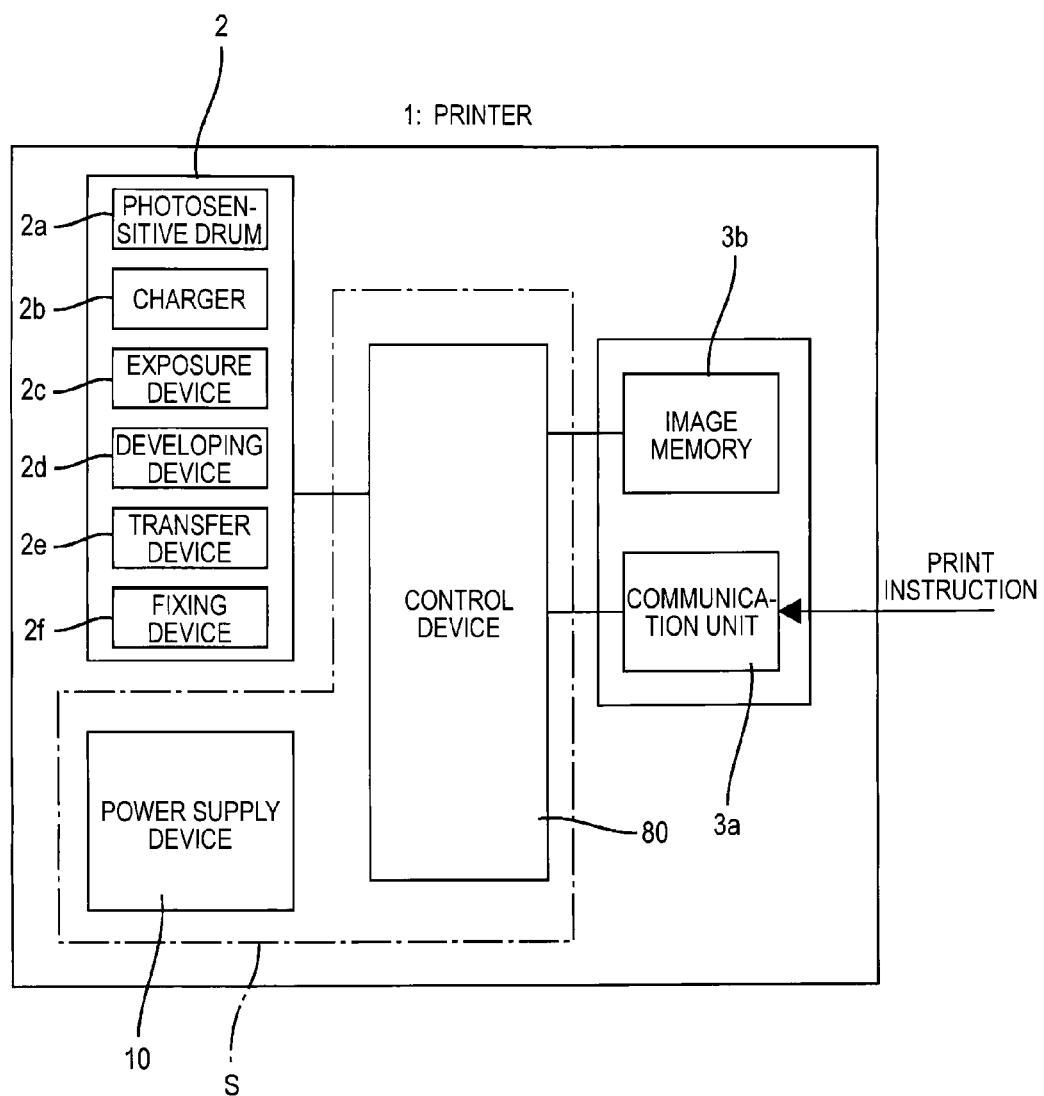
FIG. 1 is a block diagram illustrating an electrical configuration of the printer 1 according to a first embodiment.

FIG. 1 is a block diagram illustrating the electrical configuration of a printer 1 (an example of an "image forming apparatus" of this disclosure). The printer 1 includes a printing unit 2, a communication unit 3*a*, an image memory 3*b*, and a power-supply system S. The power-supply system S includes a power supply device 10 and a control device 80. The power supply device 10 is a power supply for the printer 1 and supplies power to the printing unit 2, the communication unit 3*a*, the image memory 3*b*, and the control device 80.

The printing unit 2 includes a photosensitive drum 2a, a charger 2b that performs a charging process of charging the surface of the photosensitive drum 2a, an exposure device 2c that performs an exposure process of forming an electrostatic latent image on the surface of the photosensitive drum 2a, a developing device 2d that performs a developing process of attaching a developer to the electrostatic latent image formed on the surface of the photosensitive drum 2a to form a developer image, a transfer device 2e that performs a transfer process of transferring the developer image onto a recording medium, and a fixing device 2f that performs a fixing process of fixing the developer image transferred onto the recording medium.

The printing unit 2 performs a printing process by performing the charging process, the exposure process, the developing process, the transfer process, and the fixing process to print data on the recording medium. The communication unit 3a communicates with an information terminal apparatus such as a PC and the like and has a function of receiving a print instruction or print data from the information terminal apparatus. The image memory 3b temporarily stores the print data received from the information terminal apparatus.

In the printer 1, when the communication unit 3a receives a print instruction from the information terminal apparatus, the control device 80 instructs the printing unit 2 to perform the printing process including the charging process, the exposure process, the developing process, the transfer process, and fixing process to print the print data on the recording medium. Further, the operation voltage of the printing unit 2 is 24V, whereas the operation voltage of the communication unit 3a, the image memory 3b, and the control device 80 is 3.3 V.

2. Description of Circuit of Power-Supply System

First, the configuration of the power supply device 10 in the power-supply system S will be described with reference to FIG. 2. The power supply device 10 includes a switching power source 20, a DC-DC converter 35, and a DC-DC converter 45. The switching power source 20 includes a rectifying-and-smoothing circuit 21, a transformer 23, an FET (field effect transistor) 25, a rectifying-and-smoothing circuit 27, a voltage detecting circuit 29, a control IC 50 that performs switching control on the FET 25. Further, the FET is an example of a "semiconductor switching element" of this disclosure and the control IC is an example of a "switching controller" of this disclosure.

The rectifying-and-smoothing circuit 21 is a so-called capacitor-input type and includes a bridge diode D1 that rectifies an AC voltage (220 V) of an AC power 15 (corresponding to a "main power source" in this disclosure) and a capacitor C1 that smoothes the rectified voltage. In addition, the transformer 23 is provided on the output side of the rectifying-and-smoothing circuit 21 and an input voltage Vin (a DC voltage of about 322 V) obtained by rectifying and smoothing the AC voltage is applied to a primary coil N1 of the transformer 23 through an input line Lin.

The FET 25 is an N-channel MOSFET and has a drain D connected to the primary coil N1 and a source S connected to a reference potential Ve. When an on-off signal (PWM signal) is supplied from the control IC 50 to a gate G, the FET 25 is turned on-and-off. Accordingly, the primary side of the transformer 23 is oscillated and a voltage is induced in a secondary coil N2 of the transformer 23.

Further, the voltage generating circuit 31 is provided on the primary side of the transformer 23. The voltage generating circuit 31 rectifies and smoothes the voltage induced in an auxiliary coil N3 which is provided on the primary side of the transformer 23 using a diode D2 and a capacitor C2. The voltage generating circuit 31 serves as a power source (about 20V) for the control IC 50.

The rectifying-and-smoothing circuit 27 is provided on the secondary side of the transformer 23 and includes a diode D3 and a capacitor C3. The rectifying-and-smoothing circuit 27 rectifies and smoothes the voltage induced in the secondary coil N2 of the transformer 23. Accordingly, the switching power source 20 outputs a DC voltage of 24 V through an output line Lo1.

Figure 2:
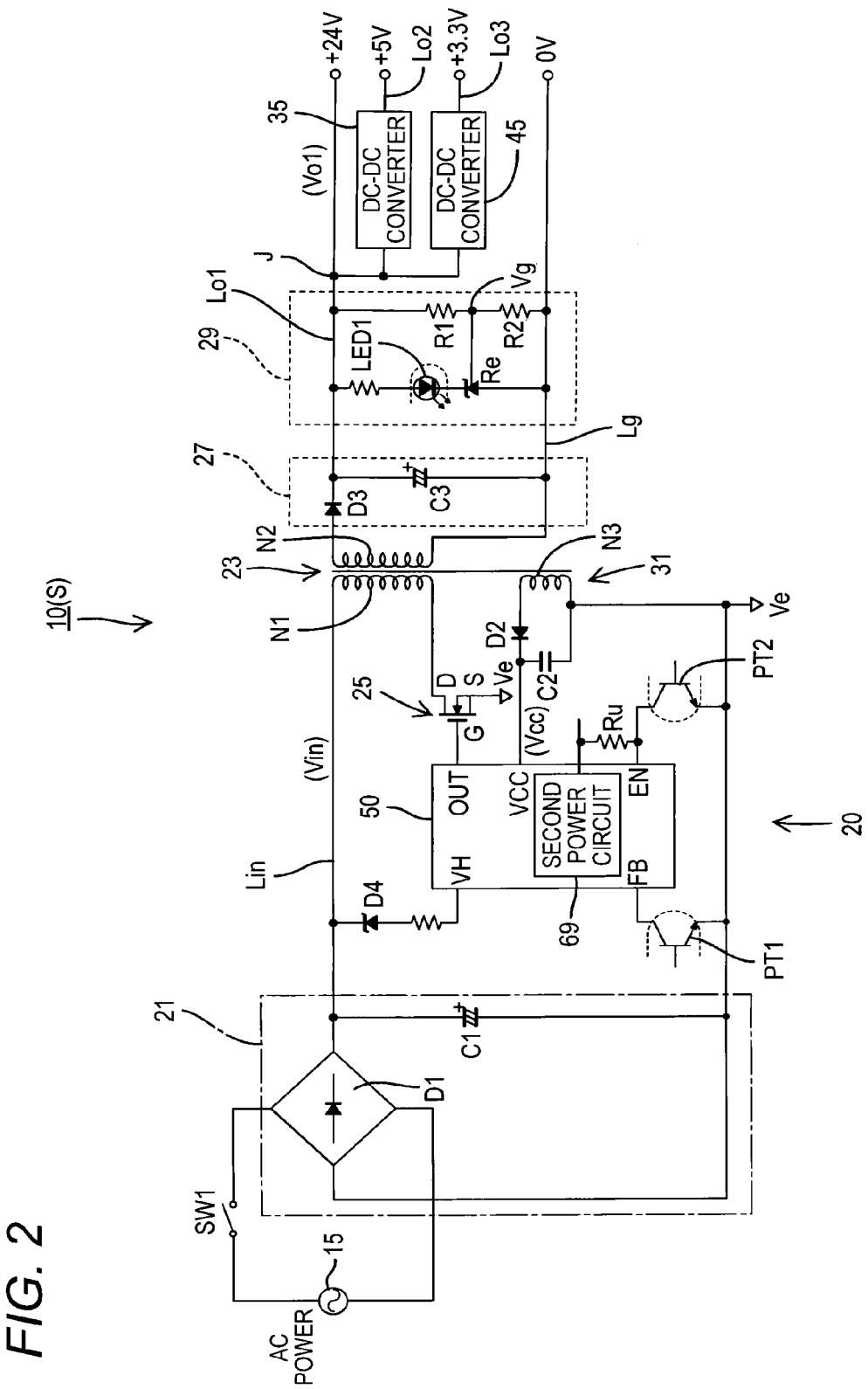
FIG. 2 is a circuit diagram of a power supply device of a power-supply system.

As shown in FIG. 2, the output line Lo1 is branched into three lines at a branch point J and DC-DC converters 35 and 45 are provided to each of the branched lines. The DC-DC converter 35 reduces the output voltage Vo1 of the switching power source 20 to 5V and outputs the voltage from an output line Lot. Further, the DC-DC converter 45 reduces the output voltage Vo1 of the switching power source 20 to 3.3V and outputs the voltage from an output line Lo3. As described above, the power supply device 10 outputs three voltages of 24 V, 5V, and 3.3V.

The voltage detecting circuit 29 is provided between the rectifying-and-smoothing circuit 27 and the branch point J of the output lines. The voltage detecting circuit 29 detects the level of the output voltage Vo1 (DC 24 V) of the switching power source 20 and includes a pair of detection resistors R1 and R2, a shunt regulator Re, and a light emitting diode LED1 that is connected in series to the shunt regulator Re.

The detection resistors R1 and R2 are provided between the output line Lo1 and a ground line Lg and detect a divided voltage Vg obtained by dividing the output voltage Vo1 by the resistance ratio. The shunt regulator Re supplies a current corresponding to the level difference between the divided voltage Vg and the reference voltage of the shunt regulator Re. Accordingly, current flow to the light emitting diode LED1 and the light emitting diode LED1 outputs an optical signal with the amount of light according to the level difference between the reference voltage and the divided voltage Vg.

The light emitting diode LED1 together with a phototransistor PT1 connected to a feedback port FB of the control IC 50 form a photo-coupler. For this reason, the optical signal of the light emitting diode LED1 is restored to an electric signal by the phototransistor PT1. Accordingly, a signal (hereinafter, referred to as a feedback signal) indicating the level difference between the reference voltage of the shunt regulator Re and the divided voltage Vg is input (feedback) to the feedback port FB of the control IC 50.

Figure 3:
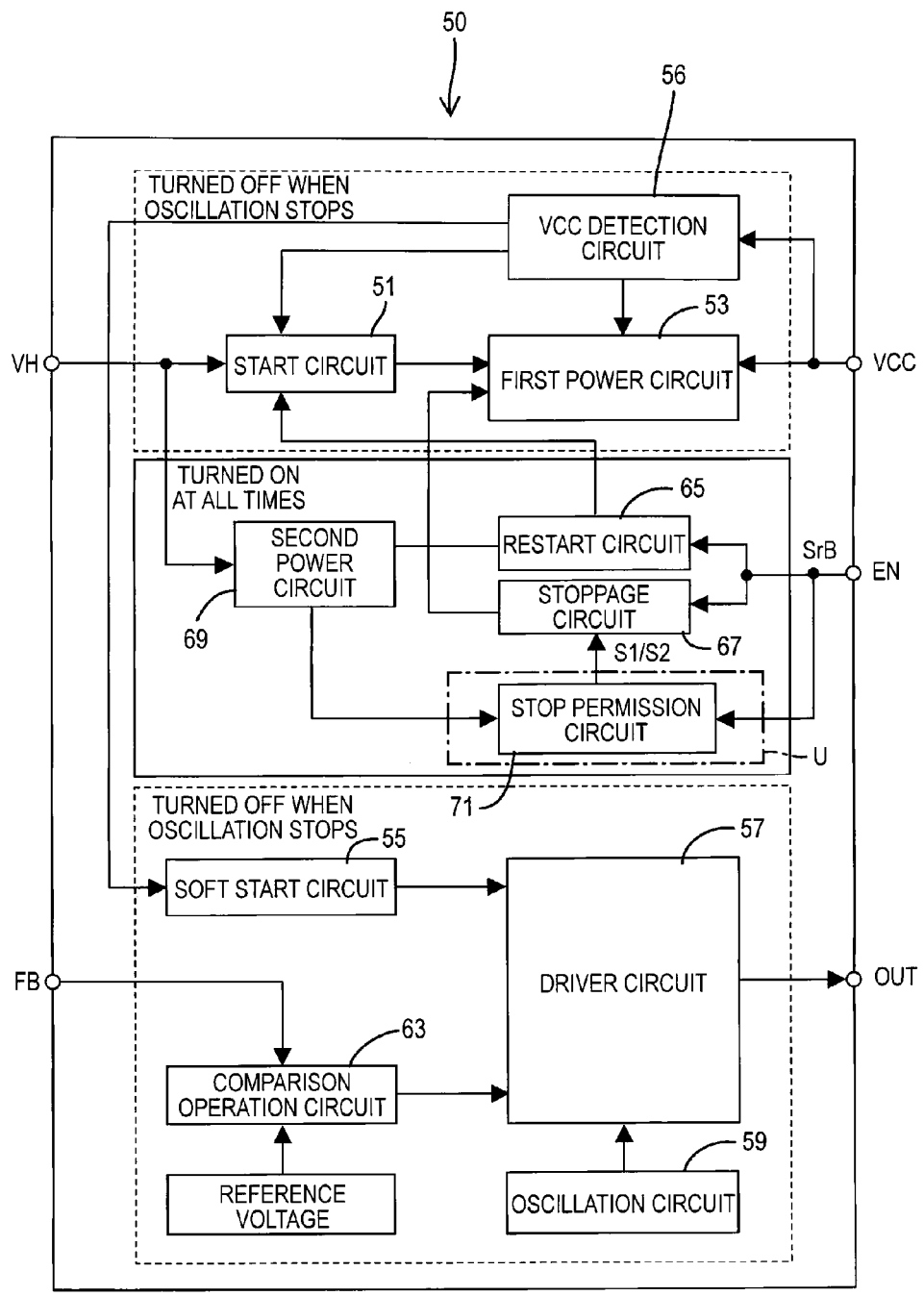
FIG. 3 is a block diagram illustrating a control IC.

As shown in FIG. 2, the control IC 50 includes five ports, that is, a power supply port VCC that is connected to the voltage generating circuit 31, a high-voltage input port VH that is connected to the input line Lin through a zener diode D4, a feedback port FB to which the feedback signal (output voltage detection signal) is input, an output port OUT that outputs an on-off signal (PWM signal), and a control input port EN. Further, the control input port EN is connected to the second power supply circuit 69 provided in the control IC 50 through the pull-up resistor Ru. In FIG. 2 or FIG. 3, a port for pull-up connection in the control IC is omitted.

The circuit block of the control IC 50 will be described with reference to FIG. 3. The control IC 50 includes a start circuit 51 connected to the high-voltage input port VH, a first power circuit 53, a soft start circuit 55, a VCC detecting circuit 56 connected to a power supply port VCC, a driver circuit 57 connected to the output port OUT, an oscillation circuit 59 that oscillates a triangular wave with a predetermined frequency, a comparison operation circuit 63 connected to the feedback port FB, a restart circuit 65, an oscillation stoppage circuit 67, a second power circuit 69, and a stop permission circuit 71.

The VCC detecting circuit 56 detects the output voltage Vcc of the voltage generating circuit 31 to determine whether the output voltage Vcc exceeds a reference value (for example, 16V). The start circuit 51 reduces an input voltage applied to the high-voltage input port VH and supplies the voltage to the first power circuit 53. That is, the start circuit 51 receives power from the AC power as a main power source to operate and starts the first power circuit 53. Further, the first power circuit 53 supplies power to the circuits 55, 56, 57, 59, and 63 except for the restart circuit 65, the stoppage circuit 67, the stop permission circuit 71 and the second power circuit 69. The circuits 55, 56, 57, 59, and 63 having the first power circuit 53 as a power supply are not supplied with power when the first power circuit 53 stops (when oscillation stops). On the other hand, the restart circuit 65, the stoppage circuit 67 and the stop permission circuit 71 having the second power circuit 69 as a power supply are applied with an electric current at all times after the AC power is applied.

The first power circuit 53 receives power from the start circuit 5 luntil the output voltage Vcc of the voltage generating circuit 31 increases to a second reference value immediately after startup, generates a power-supply voltage of 5 V, and supplies power to each of the circuits 55, 56, 57, 59, and 63. On the other hand, after the output voltage Vcc of the voltage generating circuit 31 reaches the reference value, the first power circuit 53 switches power source by a command of the VCC detection circuit 56, to be supplied from the voltage generating circuit 31, generates a power-supply voltage of 5V, and supplies power to the circuits 55, 56, 57, 59, and 63.

The soft start circuit 55 stepwisely increases the duty ratio of the on-off signal (PWM signal) which is applied to the gate G of the FET 25 through the driver circuit 57, so that it slowly increases the output of the switching power source 20 when the start up.

The comparison operation circuit 63 performs an operation of comparing the level of the feedback signal with the level of the reference voltage and outputs the feedback signal to the driver circuit 57 according to the comparison result.

The driver circuit 57 outputs the on-off signal (PWM signal) to the gate G of the FET 25 to perform switching control on the FET 25. The PWM value (duty ratio) of the PWM signal is determined on the basis of the feedback signal input to the feedback port FB.

The restart circuit 65 and the stoppage circuit 67 are commonly connected to a control input port EN, and it have a configuration in which the control signal (level signal) SrB corresponding to the level of the voltage of the control input port EN is input to both circuits 65 and 67. That is, when the voltage of the control input port EN is at a high level, the high-level control signal SrB is input to both circuits 65 and 67 via the control input port EN. When the voltage of the control input port EN is at a low level, a low-level control signal SrB is input to both circuits 65 and 67 through the control input port EN.

The stoppage circuit 67 interrupts the first power circuit 53 on condition that the high-level control signal SrB (corresponding to a "first-level" of this disclosure) is input through the control input port EN and then performs a stoppage process of stopping a switching control by the driver circuit 57. That is, when the first power circuit 53 is interrupted, the supply of power to the circuits 56, 57, 59, and 63 is cut off, and the output of the driver circuit 57 is stopped (the impedance of the output port OUT is high), and the switching control by the driver circuit 57 is stopped accordingly. Therefore, the oscillation of the transformer 23 is stopped. The term "interruption" means cutting the supply of power from the voltage generating circuit 31 to the first power circuit 53 to stop the first power circuit 53.

The restart circuit 65 outputs a restart signal to the start circuit 51 to restart the start circuit 51 on condition that the low-level control signal SrB (corresponding to "second-level" in this disclosure) is input through the control input port EN. The second power circuit 69 and the start circuit 51 are connected to the high-voltage input port VH. The second power circuit 69 reduces the voltage input from the high voltage input port VH to generate a power-supply voltage of 5V and supplies power to the restart circuit 65, the stoppage circuit 67 and the stop permission circuit 71. That is, the second power circuit 69 receives power from the AC power 15 corresponding to a main power source.

The stop permission circuit 71 is an example of a limiting circuit of this disclosure. The stop permission circuit 71 is connected to the control input port EN, and it has a configuration in which the control signal SrB inputted to the control input port EN is input thereto, similarly to the stoppage circuit 67 and the restart circuit 65. The stop permission circuit 71 outputs a limiting signal (for example, a low-level signal) for limiting a performance of the stoppage process to the stoppage circuit 67 immediately after the start-up of the switching power source 20. As a result, it is possible to limit the stoppage circuit 57 to perform a stoppage process immediately after the start-up of the switching power source 20.

The stop permission circuit 71 maintains the output of the limiting signal S1 to the stoppage circuit 67 while the voltage of the control input port EN is bein at a high level, immediately after the start-up of the switching power source 20. The stop permission circuit 71 detects the switching of the voltage of the control input port EN to stop the output of the limiting signal S1. In this example, when the voltage of the control input port EN is switched from the high level to the low level, the stop permission circuit 71 detects the switching of the voltage, and stops the output of the limiting signal S1, transmits a permission signal S2 (for example, a level signal of high level) of permitting the performance of the stoppage process to the stoppage circuit 67. Accordingly, after receiving the permission signal S2, the stoppage circuit 67 becomes possible to perform the stoppage process. According to the above description, this disclosure realizes that "the limiting circuit (in this example, the stop permission circuit) detects the switching of the voltage of the control input port and the releases (in this example, the stop of the limiting signal S1) the limitation on the performance of the stoppage process".

Next, the control device 80 will be described with reference to FIG. 4. The control device 80 includes a main block B1 that controls the printing unit 2 of the printer 1 and a mode control block B2. The main block B1 and the mode control block B2 may be formed by any one among a hard circuit such as one or more CPU, ASIC and the like, or the combination of the CPU and hard circuit.

A power supply port P1 of the main block B1 is connected to the output line Lo3 of the DC-DC converter 45, and power is supplied from the switching power source 20 through the power supply port P1 through the DC-DC converter 45. The main block B1 receives power and is turned on only in the output mode, which will be described below. When the switching power source 20 is switched to the output stop mode, which will be described below, the supply of power to the main block B1 is cut and the main block B1 is turned off.

A power supply port P2 of the mode control block B2 is connected to the DC-DC converter 35 side, and power is supplied from the switching power source 20 to the power supply port P2 through the DC-DC converters 35. Specifically, a capacitor (electric double layer capacitor for storage) C4 is connected to the output line Lo2 of the DC-DC converter 35 through the diode D4. The diode D4 prevents an inverse current from the capacitor C4 to the DC-DC converter 35. The capacitor C4 is an example of an "power storage unit" of this disclosure.

Figure 4:
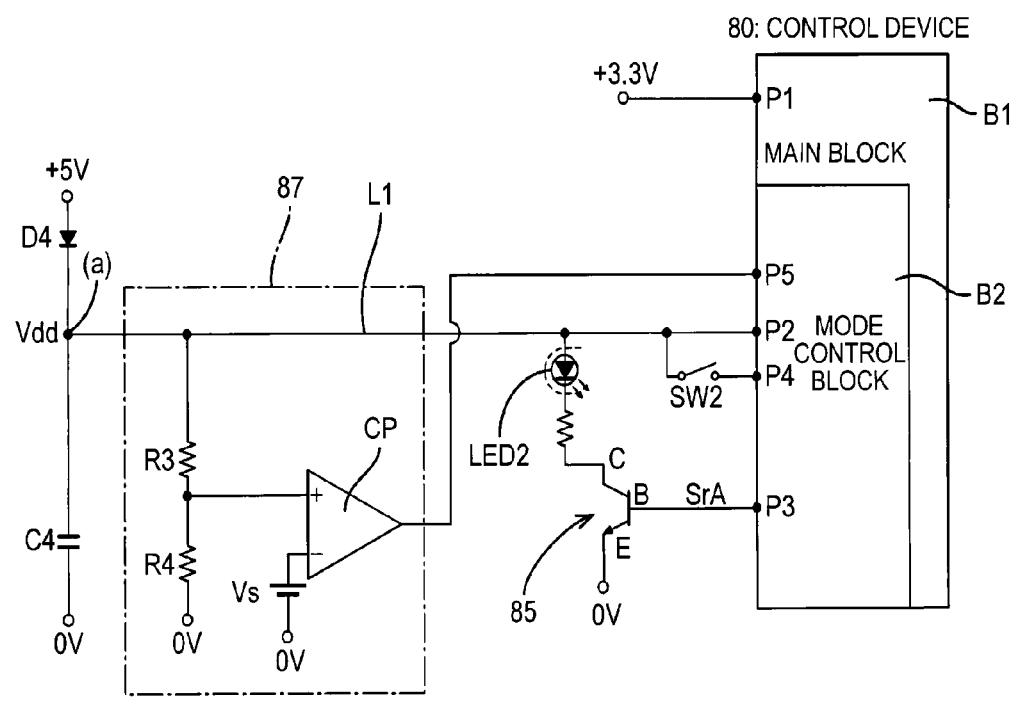
FIG. 4 is a circuit diagram illustrating a circuit of a control device side in the power-supply system.
Figure 5:
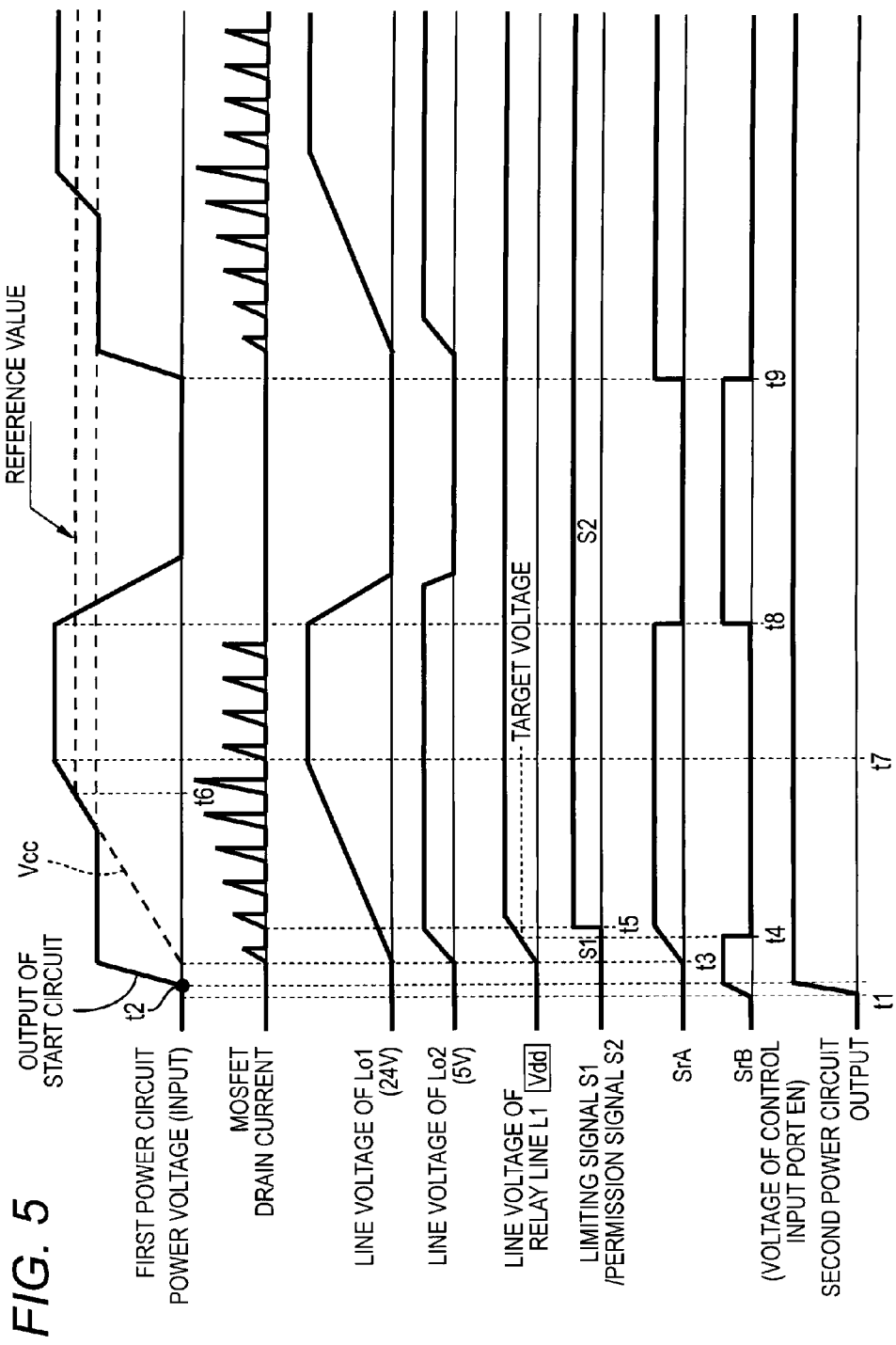
FIG. 5 is a view illustrating output waveforms of a switching power source.

A relay line L1 is drawn from a connection point (point (a) in FIG. 4) between the capacitor C4 and the diode D4. The relay line L1 is connected to the power supply port P2 of the mode control block B2. Therefore, the mode control block B2 receives power from the switching power source 20 through the DC-DC converters 35 in the output mode. The capacitor C4 serves as a power source for the mode control block B2 in the output stop mode; a charging current is supplied from the DC-DC converter 35 to the capacitor C4 through the output line Lo2 in the output mode.

As shown in FIG. 4, a control port P3 is provided in the mode control block B2 and is connected to a base B of a transistor 85. The transistor 85 has an emitter E connected to 0 V and a collector C connected to the cathode of a light emitting diode LED2. Further, an input port P4 is provided in the mode control block B2. The mode control block B2 is connected to a mode switching switch SW2 for instructing a mode switching by the user.

The light emitting diode LED2 has an anode connected to the relay line L1. The light emitting diode LED2 and a phototransistor PT2 form a photo-coupler. As shown in FIG. 2, the phototransistor PT2 has a collector (corresponding to one side in this disclosure) connected to the control input port EN and an emitter (corresponding to the other side in this disclosure) connected to a reference potential (corresponding to "second-level potential" in this disclosure) Ve of primary side. When a high-level switching signal SrA is output to a base of the transistor 85 from the control port P3 of the mode control block B2 and the light emitting diode LED 2 configuring a photo-coupler is turned on, the photo transistor PT2 is to be a conduction state (ON-state) and the control input port EN of the control IC 50 is changed to a low level (reference potential Ve). Further, when a low-level switching signal SrA is output to a base of the transistor 85 from the control port P3 of the mode control block B2 and the light emitting diode LED 2 forming a photo-coupler is turned off, the photo transistor PT2 is to be non-conduction state (OFF-state), and the control input port EN of the control IC 50 is changed to a high level (output potential of the second power circuit 69).

Incidentally, the light emitting diode LED2 corresponds to the "light emitting diode" of this disclosure, the phototransistor PT2 corresponds to the "light receiving element" of this disclosure. Also, the photo-coupler formed of the light emitting diode LED2 and the photo transistor PT2 corresponds to the "switching circuit" of this disclosure.

The mode control block B2 has a function for outputting the switching signal SrB to the control IC 50 to switch the voltage level of the control input port EN and thereby switching the switching power source 20 between the output mode and the output stop mode. The output mode causes the control IC 50 to perform the switching control and then cause the primary side of the transformer 23 to oscillate, so that the switching power source 20 is switched to an output state. Further, the output stop mode stops the switching control by the control IC 50, thereby stopping the output of the switching power source 20.

Incidentally, in this embodiment, in case of switching the switching power source 20 to the output mode, the light emitting diode LED2 is turned on by outputting the high-level switching signal SrA and then the phototransistor PT2 is conducted. As a result, the voltage of the control input port EN is switched to a low level (corresponding to "second-level" of this disclosure). On the other hand, in case of switching the switching power source 20 to the output stop mode, the light emitting diode LED2 is turned off by outputting the low-level switching signal SrA and the phototransistor PT2 is not conducted. As a result, the voltage of the control input port EN is switched to a high level (corresponding to "first-level" of this disclosure). Further, immediately after the mode control block B2 receives power from the switching power source 20 and starts up, the high-level switching signal SrA is output to the control IC 50, thereby turning on the light emitting diode LED2. The reason is as follows. When the mode control block B2 is started up, if the low-level switching signal SrA is output to the control IC 50 and turns off the light emitting diode LED2, the switching power source 20 is shifted to an output stop mode immediately after an AC power is applied, so that a state where it is impossible to start up the power-supply system S is caused.

The detection circuit 87 shown in FIG. 4 detects a line voltage (charging voltage of the capacitor C4, voltage at a point (a) shown in FIG. 4) Vdd of the relay line L1. The detection circuit 87 includes detection resistors R3 and R4 that detect the line voltage Vdd of the delay line L1, and a comparator CP that compares the voltage values detected by the detection resistors R3 and R4 with a reference value and outputs the comparison result.

When the line voltage Vdd is more than the reference voltage Vs, the comparator CP outputs a high-level detection signal to a port P5 of the mode control block B2. When the line voltage Vdd is less than the reference voltage, the comparator CP outputs a low-level detection signal to a port P5.

When the low-level detection signal is output from the comparator CP, the mode control block B2 shifts the switching power source 20 to the output mode and makes the capacitor C4 recharge. Accordingly, even when the output stop mode is maintained for a long time and the charging voltage of the capacitor C4 is reduced, it is possible to maintain the power-supply voltage of the mode control block B2 by recharging the capacitor C4. Further, a switch SW2 shown in FIG. 4 is a mode switching switch used by the user to instruct the mode control block B2 to switch the modes.

3. Description of Operations of Power-supply System S 3-1. Operations when AC power is Applied When the power supply switch SW1 is turned on (time point t1), the input voltage Vin obtained by rectifying and smoothing the AC voltage of the AC power 15 is applied to the input line Lin of the switching power source 20. Then, since power is supplied from the AC power 15 through the high voltage input port VH, the start circuit 51 and the second power circuit 69 in the control IC 50 starts (time point t2). The second power supply circuit 69 after the start-up supplies power to the restart circuit 65, the stoppage circuit 67, and the stop permission circuit 71. By the supply of electric power, the stoppage circuit 67 or the restart circuit 65 is in an operating state; but, immediately after the start-up of the power supply, since the limiting signal S1 is outputted to the stoppage circuit 67 from the stop permission circuit 71, the stoppage circuit 67 is to be in a state where the performance of the stoppage process is restricted. Furthermore, after the start-up of the second power circuit 69, the voltage of the control input port EN is at a high level (time point t2).

The start circuit 51 after the start-up reduces the input voltage Vin and outputs the voltage to the first power circuit 53. Accordingly, the first power circuit 53 starts up. The output voltage of the first power circuit 53 after the first power circuit 53 starts up gradually increases. Then, when the output voltage reaches a predetermined value, each of the circuits 55, 56, 57, 59, and 63, which receive power from the first power supply circuit 53, becomes an ON-state. Thereafter, the soft start circuit 55 applys an on-off signal (PWM signal) to the gate G of the FET 25 through the driver circuit 57. Thus, since the FET 25 is repeatedly turned on-and-off, the primary side of the transformer 23 of the switching power source 20 starts to be oscillated, a voltage is induced on the secondary side of the transformer 23 (time point t3: starting of oscillation).

The soft start circuit 55 stepwisely increases the PWM value. As a result, the on time of the FET 25 stepwisely increases, and the output of the switching power source 20 increases slowly. As a result, the line voltages of the output line Lo1 of 24V-system, the output line Lo2 of 5V system and the output line Lo3 of 3.3V system increase.

Further, the line voltage Vdd (a voltage at the point (a) shown in FIG. 4 as a power-supply voltage Vdd of the mode control block B2) of the relay line L1 increases according to the increase of the line voltage of the output line Lo2 of 5V system. Then, when the line voltage Vdd of the relay line L1 reaches a target voltage (a voltage that is more than the voltage enabling the control device 80 to be operable, and enabling the light emitting diode LED2 to be turned on, for example, 3V), the mode control block B2 starts up (time point t4). The mode control block B2 after the start-up outputs a high-level switching signal SrA to transistor 85 from the control port P3. When the high-level switching signal SrA is output, the transistor 85 is turned on and the light emitting diode LED2 is turned on. Thus, since the phototransistor PT2 is conducted (turned on), the level of the control input port EN of the control IC 50 is switched from the high level to the low level.

Then, at time point t4 that the mode control block B2 starts up, if the level of the control input port EN of the control IC 50 is switched from the high level to the low level, the stop permission circuit 71 detects switching of voltage. Then, the permission signal S2 is transmitted to the stoppage circuit 67 from the stop permission circuit that detects the switching of the voltage (time point t5). As a result, the limited state of the stoppage process that is maintained continuously after the AC power is applied is released, and the stoppage circuit 67 is allowed to perform the stoppage process after the time point t5.

As described above, according to the restriction of the stoppage process of the stoppage circuit 67 during the predetermined period from a time when the AC power is applied, the power-supply system S can be definitely started. The reason is as follows. The mode control block B2 cannot operate until the line voltage Vdd of the relay line L1 reaches the target voltage (time point t1 to t4) from the time when the AC power is applied. In this case, the transistor 85 is in the OFF state, and the light emitting diode LED2 of the photo coupler is in a state being tuned off. Therefore, since the level of the control input port EN of the control IC50 becomes tehhigh level, if the stoppage process performed by the stoppage circuit 67 is not limited, the stoppage circuit 67 performs the stoppage process to cut off the first power circuit 53, as a result, there is capable of stopping the circuits 55, 56, 57, 59, and 63 which receive power from the first power supply circuit. In other words, if the stoppage process performed by the stoppage circuit 67 is limited, since there is no concerns that the first power supply circuit 53 is interrupted when AC power is applied, it is possible to definitely start the power-supply system S without stopping each of the circuits 55, 56, 57, 59 and 63.

Further, at the stage of time point t4, the line voltage of the output line of the 24V-system does not reach the target voltage, and the output of the switching power source 20 increases further. Then, while the VCC detection circuit 56 monitors the output voltage Vcc of the voltage generating circuit 31, when the output voltage Vcc exceeds the reference value, it instructs the first power supply circuit 53 to switch the source of the power supply from the start circuit 51 side to the voltage generating circuit 31 side (time point t6). Thus, after the output voltage Vcc of the voltage generating circuit 31 exceeds the reference value (after time point t6), the first power circuit 53 receives power from the voltage generating circuit 31 side, and the start circuit 51 is stopped.

When the output voltage Vcc of the voltage generating circuit 31 exceeds the reference value, the VCC detection circuit 56 stops the soft start circuit 55. Then, after the soft start circuit 55 is stopped, it is switched to the feedback control, and the driver circuit 57 performs the PWM output based on a feedback signal input to the feedback port FB. Accordingly, the output of the switching power source 20 is controlled so that the output voltage Vo1 detected by the voltage detection circuit 29 reaches a target voltage of 24V (output mode). Further, in the example of FIG. 5, after applying the AC power at time point t1, the line voltage of 24V-system of the switching power source 20 reached 24V, which is a target voltage, at time point t7.

In the output mode, the electric power is supplied to each component of the printer 1 by the power supply device 10. That is, the printing unit 2 receives power from the switching power source 20 through the output lines Lo1 (power-supply voltage 24V). Further, the communication unit 3a, the image memory 3b and the main block B1 receive power from the switching power source 20 via the DC-DC converter 45 (power-supply voltage 3.3V). Further, the mode control block B2 of the control device 80 receives power from the switching power source 20 via the DC-DC converter 35 (power-supply voltage 5V).

Therefore, the printer 1 is to be in a state of being printable, that is, a state of being capable of receiving a print instruction from an information terminal apparatus such as a PC and the like to perform a printing process according to a print instruction. In the output mode, a charging current is supplied to the capacitor C4 through the output line Lo1 of the switching power source 20 and the diode D4. Therefore, the capacitor C4 is charged.

3-2. Shift from Output Mode to Output Stop Mode, from Output Stop Mode to Output Mode Then, when the mode switching switch SW2 is operated in the output mode, the standby state of the printer 1 continues for a predetermined time, since it is switched to the output stop mode, the mode control block B2 of the control device 80 outputs a low-level switching signal SrA to the transistor 85 (time point t8).

When the low-level switching signal SrA is output, the transistor 85 is to be the off state and then the light emitting diode LED2 is turned off. Accordingly the phototransistor PT2 is to be not conducted (OFF-state), the level of the control input port EN of the control IC 50 is shifted from the low-level to the high-level. As a result, the high-level control signal SrB is input to the restart circuit 65 and the stoppage circuit 67 through the control input port EN. Then, when the stoppage 67 receives the high-level conrol signal SrB, the stoppage circuit 67 perform the stop process to interrupt the first power circuit 53. Therefore, the power supply using the first power circuit 53 as power source to the each circuit 55, 56, 57, 59, 63 is stopped.

Accordingly, the driver circuit 57 is stopped, and the impedance of the output port OUT is to be high, so that the oscillation of the primary side of the transformer 23 is interrupted. Therefore, the switching power source 20 is switched to the output stop mode in which the output of the switching power source 20 is stopped.

Since, in the output stop mode, the switching power source 20 is in an output stop state, all the power supply to the printing unit 2, the communication unit 3a, the image memory 3b, and the main block B1 of the control device 80 is stopped. Incidentally, the mode control block B2 of the control device 80 is in a performing state since it receives power from the capacitor C4.

Thereafter, when a low-level detection signal is output to the port P5 from the comparator CP, or when the switching switch SW2 is operated in the output mode, the control block B2 of the control device 80 is shifted to an output mode, so that it outputs a high-level switching signal SrA to the transistor 85 (time point t9).

When the high-level switching signal SrA is output, transistor 85 is turned on, so that the light emitting diode LED2 is turned on. As a result, since the phototransistor PT2 is conducted (ON-state), the level of the control input port EN of the control IC 50 is switched from the high level to the low level. Thus, the stoppage circuit 67 and restart circuit 65 are inputted with the low-level control signal SrB via the control input port EN. Then, when the low-level control signal SrB is received, the restart circuit 65 restarts the start circuit 51.

Accordingly, similarly to a time when the AC power is supplied, the first power circuit 53 generates a power-supply voltage of 5V from the voltage which is output from the start circuit 51 and supplies power to the circuits 55, 56, 57, 59, 63, and 67. Then, the soft-start circuit 55 is operated, the output of the switching power source 20 increases slowly, and the switching power source 20 is shifted back to the output mode.

4. Description of Effect

As described above, in the power-supply system S, the mode of the switching power source 20 is controlled by the level signal (control signal SrB). Therefore, the malfunction thereof due to noise is small compared to a control system controlled by a pulse signal. Further, since the stop permission circuit 71, which is a limiting circuit, limits the operation of the stoppage circuit 67 until the output voltage (a line voltage Vdd of the relay line L1) of the switching power source 20 reach a target voltage (in this example, the period of time point t1 to t4), it is possible to definitely start the switching power source 20 without interrupting the first power circuit 53 due to the stoppage circuit 67 immediately after AC power is applied.

Further, since the present power-supply system S stops the oscillation of the primary side of the transformer 23, it is possible to reduce power consumption. Further, in the present power-supply system, it is possible to switch the level of the control signal SrB by switching the voltage of the control input port EN.

Further, in the present power-supply system S, the voltage of the control input port EN, i.e., the level of the control signal SrB is switched by using the photo-coupler configured by the light emitting diode LED2 and the phototransistor PT2. In the case where the voltage of the control input port EN is switched by using the photo-coupler configured by the light emitting diode LED2 and the phototransistor PT2, it is possible to isolate the switching power source 20 and the mode control block B2. However, when power is not supplied to the photo-coupler configured by the light emitting diode LED2 and the phototransistor PT2, it is not possible to intentionally perform the switching of the voltage of the control input port, and there is a possibility that the switching power source 20 malfunctions. According to the device having a above-described configuration it is possible to suppress malfunctions of the switching power source 20.

Further, in the present power-supply system S, the light emitting diode LED2 is turned on during the output mode, and the light emitting diode LED2 is turned off during the output stop mode. If the turned on-and-off state are reversed, it is necessary to continuously maintain the on-state of the light emitting diode LED2 during the output stop mode. In this case, the power consumption of the output stop mode increases, so that the power of the capacitor C4 is consumed in a short period of time. In this regard, in the power system S, the light-emitting diode LED2 is in an off-state during the output stop mode, so that the power consumption in the output stop mode is small. Thus, it is possible to maintain the charged state of the capacitor C4 for a long time.

Further, at a time when the AC power is supplied, since the capacitor C4 have not been in a charged state, a intended switching signal cannot be output to the switching power source 20 from the mode control block B2 and it is impossible to turn on the light emitting diode LED2, so that there is a possibility that the switching power source 20 malfunctions. According to the device having a above-described configuration, it is possible to suppress malfunctions of the switching power source 20.

Second Embodiment

Figure 6:
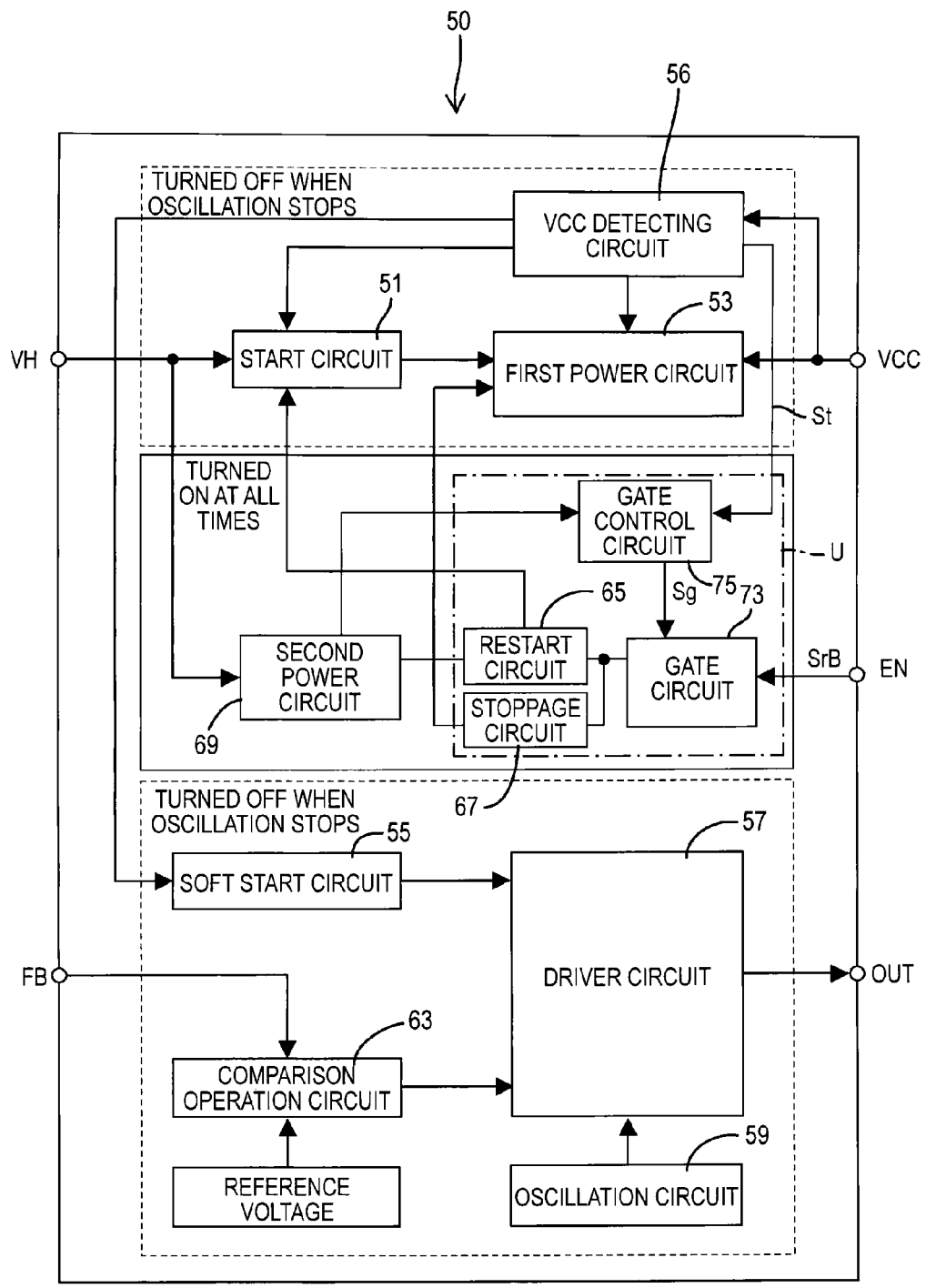
FIG. 6 is a block diagram illustrating a control IC according to a second embodiment.
Figure 7:
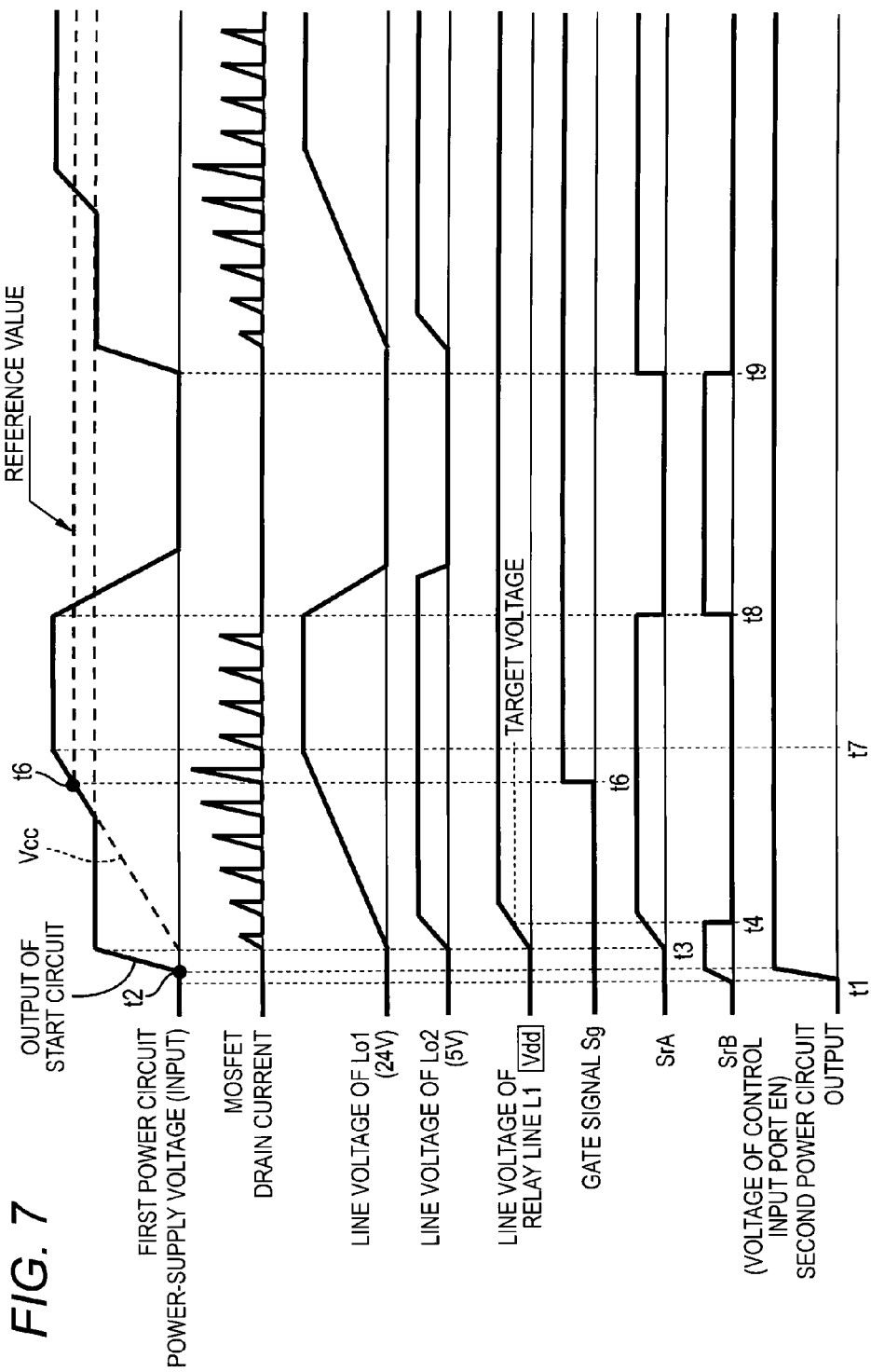
FIG. 7 is a view illustrating output waveforms of the switching power source.

Next, the second embodiment of this disclosure will be described with reference to FIGS. 6 and 7. FIG. 6 is a block diagram illustrating a control IC according to the second embodiment, and FIG. 7 is a view illustrating output waveforms of a switching power source.

In the first embodiment, the performance of the stoppage process in the stoppage circuit 67 is limited by a limiting circuit (in more detail, stop permission circuit 71) until the line voltage Vdd of the relay line L1 is increased to a target voltage after an AC power is applied (time point t1 to time point t4).

In the second embodiment, the limiting circuit for limiting the performance of the stoppage process is formed by a circuit different from the stop permission circuit 71 of the first embodiment. In more detail, in the second embodiment, the limiting circuit U is formed with a gate circuit 73 and a gate control circuit 75.

As shown in FIG. 6, the gate circuit 73 is connected commonly to the restart circuit 65 and the stoppage circuit 67, and the control signal SrB according to the voltage of the control input port EN is input to the restart circuit 65 and the stoppage circuit 67 through a gate circuit 73.

The gate circuit 73 performs a function of switching whether the control signal SrB is to be input to the restart circuit 65 and the stoppage circuit 67, based on the gate control signal Sg output from the gate control circuit 75. That is, for the period in which a low-level signal is output as the gate control signal Sg, the control signal SrB is blocked (a gate is closed) so that the control signal SrB is not input to the restart circuit 65 and the stoppage circuit 67. On the other hand, for the period in which a high-level signal is output as the gate control signal Sg, the control signal SrB inputted to the control input port EN is input (a gate is opened) to the restart circuit 65 and the stoppage circuit 67.

The gate control circuit 75 outputs the gate control signal Sg to the gate circuit 73 to control whether the control signal SrB is to be input to the stoppage circuit 67 and the restart circuit 65.

After an AC power is applied, the gate control circuit 75 outputs a low-level gate control signal Sg to at least the gate circuit 73 until the line voltage Vdd of the relay line L1 increases to a target voltage (time point t1 to time point t4). Accordingly, similarly to the case where the stoppage process performed by the stoppage circuit 67 is limited by using the stop permissions circuit 71, since there is no case where the stoppage circuit 67 is operated immediately after the AC power to block the first power supply circuit 53, it is possible to definitely start up the switching power source 20.

As shown in FIG. 7, the timing (time point t6) when the output voltage Vcc of the voltage generating circuit 31 reaches the reference value (time point t6) is late (always) as compared with the timing (time point t4) when the line voltage Vdd of the relay line L1 reaches the target voltage. The reason is as follows. Since the relay line L1 is an output of the 5V system, it reaches the target voltage at the initial stage that the output of the 24V-system of the switching power source 20 starts to rise by the early stage after the start-up of the switching power source 20, that is by the start-up of the soft start circuit 55. In contrast, the reference voltage of the output voltage Vcc of the voltage generating circuit 31 is set according to the timing (the timing of stop of the soft start circuit 55) when the output of the 24V-system of the switching power source 20 is substantially stable.

For this reason, a timing signal St is output from the Vcc detection circuit 56 to the gate control circuit 75 at a time point (time point t6) when the output voltage Vcc of the voltage generating circuit 31 becomes the reference value, and the gate control circuit 75 swicthes the gate control signal Sg from a low level (gate closed) to a high level (gate opened) on condition that it receives the timing signal St from the Vcc detection circuit 56. Accordingly, it is possible to determine a switch timing of the gate control signal Sg by using the VCC detection circuit 56 that switches the power supply destination (power supply) to the first power supply circuit 53.

A method of determining the switch timing of the gate control signal Sg may be performed by another method of detecting the power-supply voltage Vdd of the mode control block B2 and comparing the detected voltage with a target voltage, for example. However, in this case, it is necessary to provide a detecting unit for detecting the power-supply voltage Vdd of the mode control block B2 and a comparing unit for comparing the detected value of the detecting unit with a target voltage. According to this disclosure, the method determines the switch timing of the gate control signal Sg by using the VCC detection circuit 56, so that there is no need to provide the comparing unit or the detecting unit. Therefore, it is possible to simplify the configuration of the switching power source 20.

Additionally, according to the descriptions, this disclosure realizes following operation. The gate control circuit after the start-up outputs an instruction (in this example, a low-level gate control signal Sg) to limit an input of the control signal SrB to the gate circuit until the timing signal St is input (in this example, time point t1 to time point t6) from a signal output unit (in this example, Vcc detection circuit 56), and it outputs an instruction (in this example, a high-level gat control signal Sg) to allow an input of the control signal SrB to the gate circuit at a time (in this example, time point t6) when the timing signal St is input from the signal output unit (in this example, the VCC detection circuit 56)."

Third Embodiment

Figure 8:
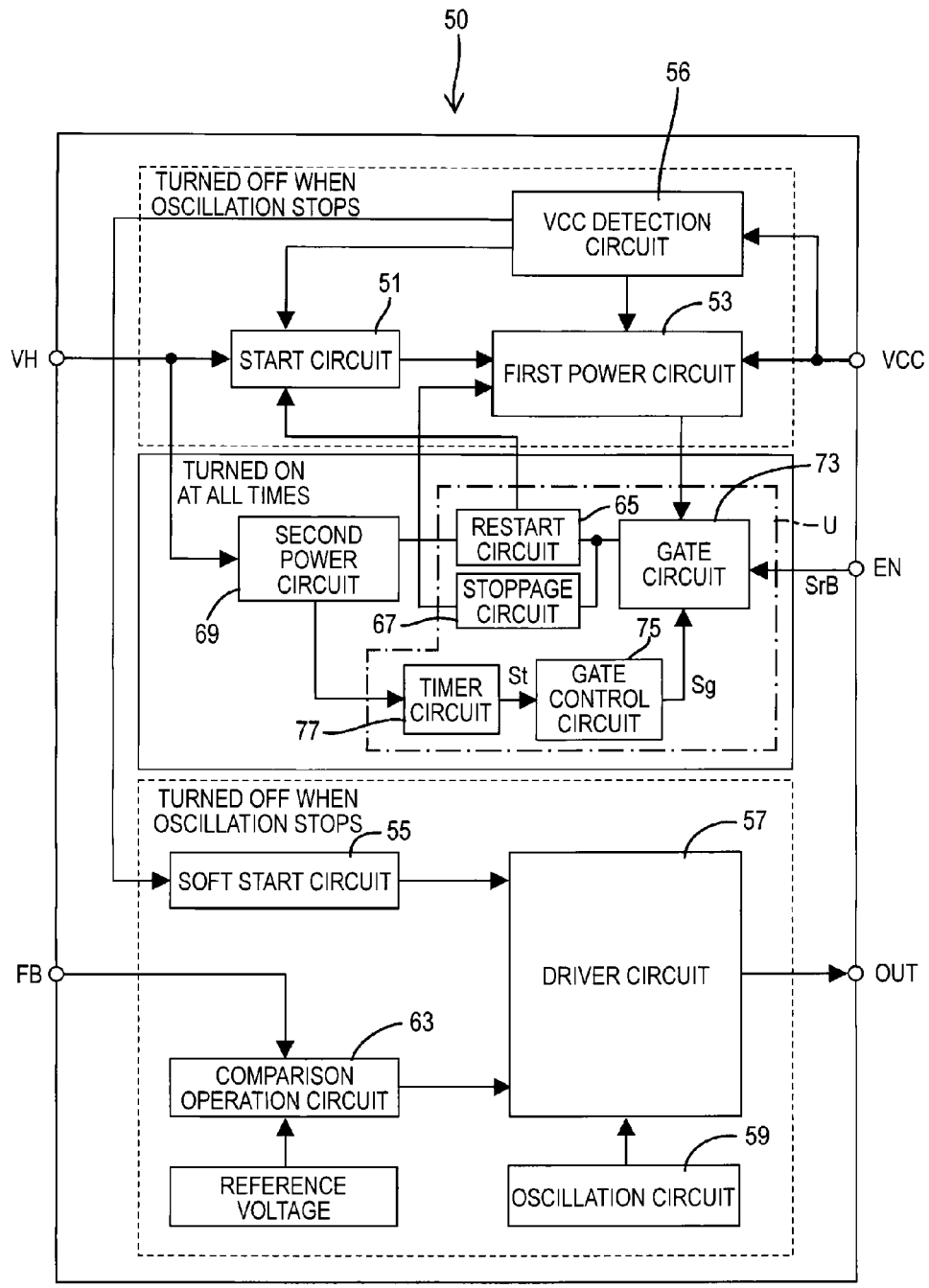
FIG. 8 is a block diagram illustrating a control IC according to a third embodiment.
Figure 9:
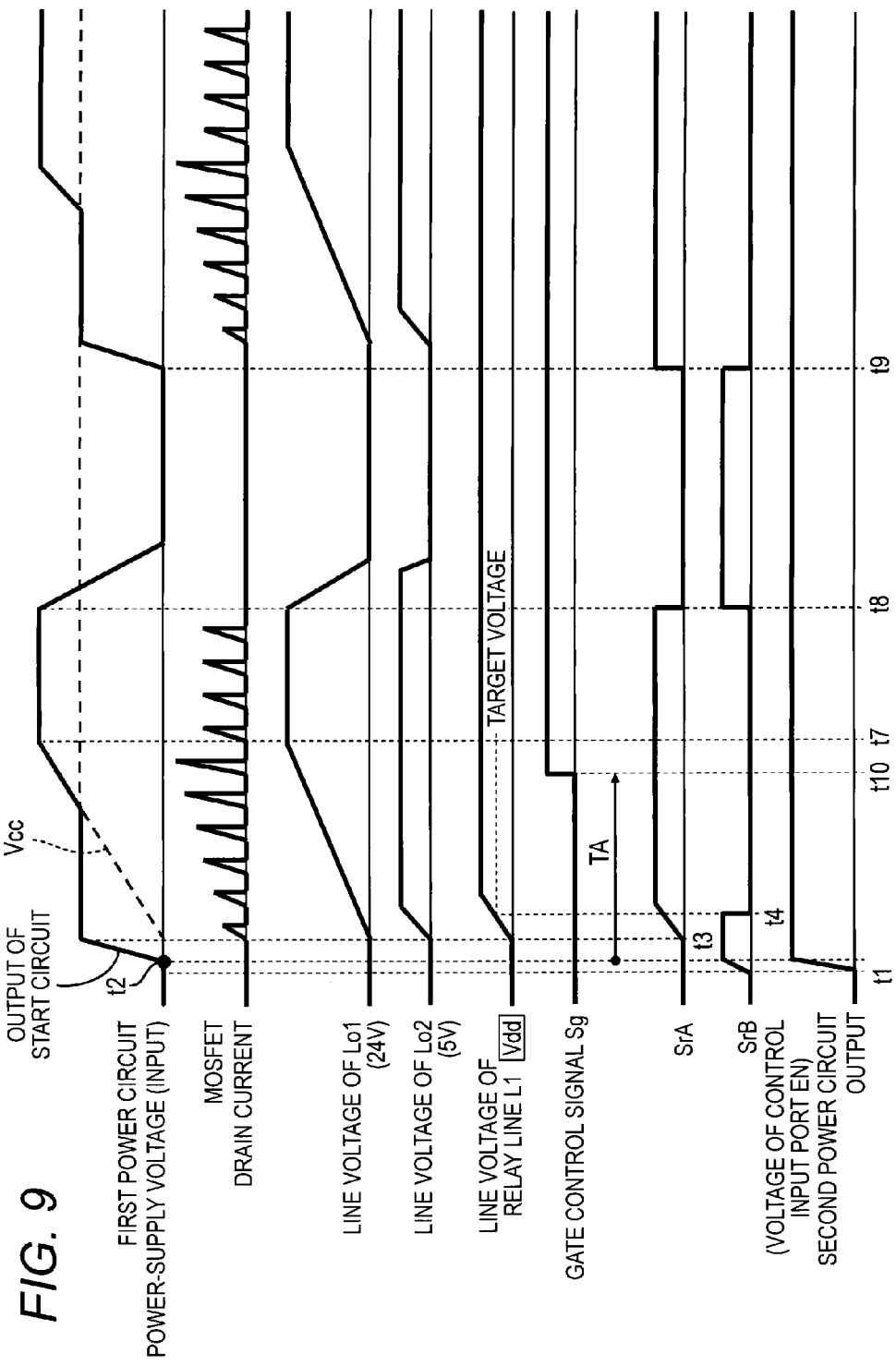
FIG. 9 is a view illustrating output waveforms of the switching power source.

Next, the third embodiment of this disclosure will be described with reference to FIGS. 8 and 9. FIG. 8 is a block diagram illustrating a control IC, and FIG. 9 is a block diagram illustrating output waveforms of a switching power source according to the third embodiment.

In the second embodiment, the switch timing (a timing of switching from a closed gate to an opened gate) of the gate control signal Sg is determined by using the VCC detection circuit 56. In the third embodiment, the switch timing (a timing of switching from a closed gate to an opened gate) of the gate control signal Sg is determined by using a timer circuit 77. Incidentally, the timer circuit 77 is a "timer" according to an example of this disclosure.

The timer circuit 77 is operated by the second power supply circuit 69 as a power supply. The timer circuit 77 receives power and starts (time point t2), and then the timer circuit 77 counts a predetermined time TA. The Predetermined time TA counted by the timer circuit 77 is set to be sufficiently longer than the time (t1 to t4) during which the line voltage Vdd of the relay line L1 reaches a target voltage after the AC power is applied.

After counting a predetermined time TA, the timer circuit 77 outputs the timing signal St to the gate control circuit 75. The gate control circuit 75 switches the gate control signal Sg form a low level (gate closed) to a high level (gate opened) on condition that it receives the timing signal St from the timer circuit 77 (time point t10). Accordingly, in the time (t1 to t4) during which the line voltage Vdd of the relay line L1 reaches a target voltage, it is possible to block the input of the control signal SrB to the stoppage circuit 67 and thereby it is possible to limit the stoppage process in the stoppage circuit 67. Therefore, similarly to the first embodiment and the second embodiment, it is possible to definitely start the switching power source 20.

Other Embodiments

This disclosure is not limited to the above description and the embodiments described with reference to the drawings. For example, the following embodiments are also included in the technical scope of this disclosure.

(1) In the first to third embodiments, the power-supply system S is used in the printer as an example. However, the power-supply system S may be applied to any electric apparatus, and the purpose of use of the power-supply system S is not limited to the printer. For example, the power-supply system S may be widely applied to home appliances, such as televisions or video players. In addition, in the first to third embodiments, the electro-photographic printer is given as an example, but this disclosure may be applied to an ink-jet printer.

(2) In the first to third embodiments, the FET(field effect transistor) is given as an example of the semiconductor switching element, but a bipolar transistor may be used.

(3) In the first to third embodiments, the control device 80 is configured so as to include two functional blocks such as the main block B1 and the mode control block B2. However, the control device 80 may include at least the mode control block B2. For example, the main block B1 may be provided separately from the control device 80.

Figure 10:
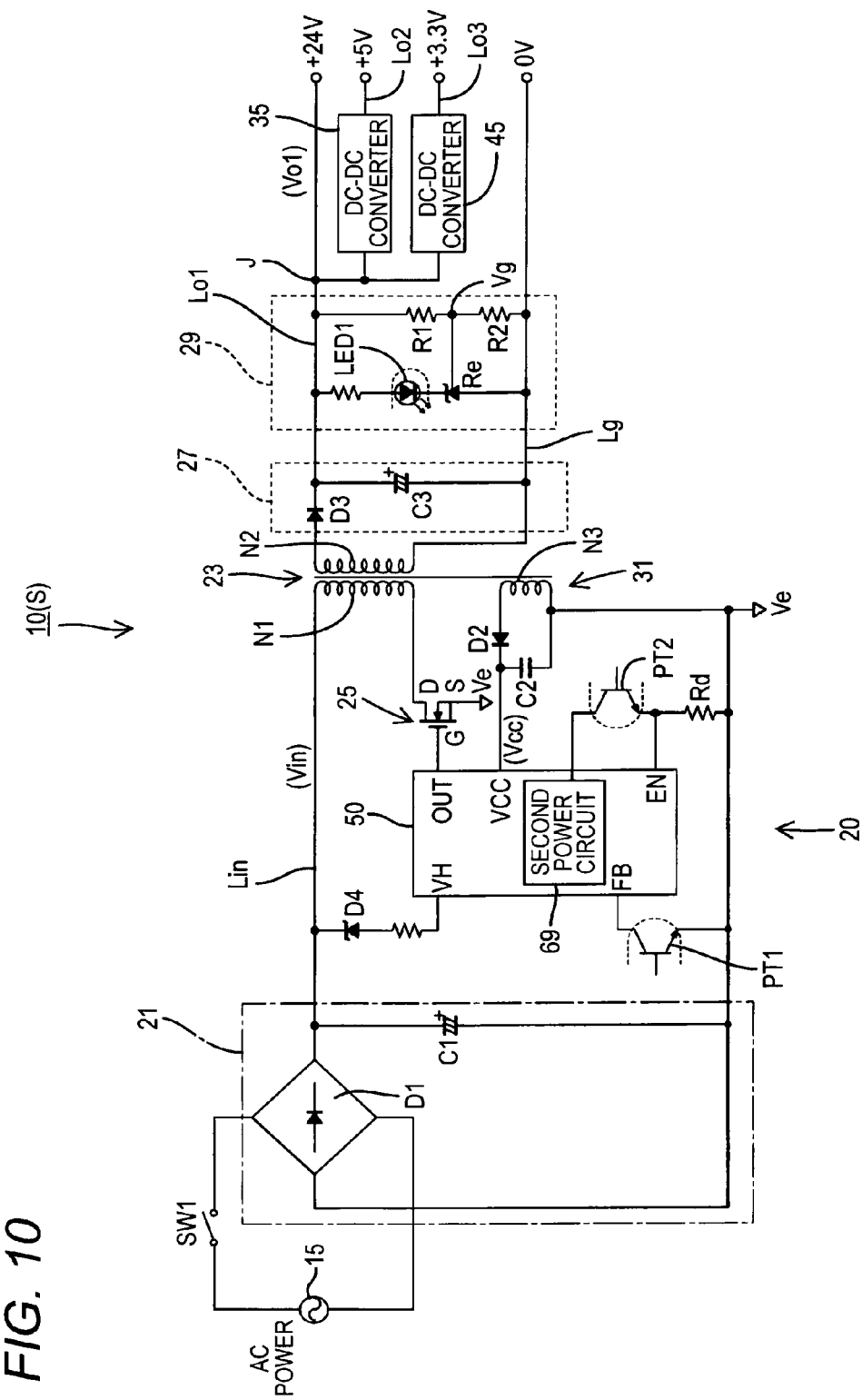
FIG. 10 is a circuit diagram illustrating a power supply device in a power-supply system (illustrating an example of variation).

(4) In the first to third embodiments, the high-level control signals SrB corresponding to the output stop mode and the low-level control signal SrB corresponding to the output mode are given as an example, but the high-and-row levels of the control signal SrB may be reversed. That is, it may be a low-level control signal SrB corresponding to the output stop mode and a high-level control signal SrB corresponding to the output mode. In this case, as shown in FIG. 10, the control input port EN is connected to the reference potential Ve via a pull-down resistor Rd, Then, the collector of the phototransistor PT2 may be connected to the second power supply circuit 69 side, and an emitter may be connected to the control input port EN.

(5) In the first to third embodiments, the photo-coupler (light emitting diode LED2 and phototransistor PT2) is given as an example of a switching circuit for switching a voltage of the control input port EN. The switching circuit only have to switch a voltage of the control input port EN in response to the switching signal SrA output from the control device, for example, it may be formed by a switching element such as FET or transistor that is turned on-and-off in response to an input of the switching signal. Further, in the first embodiment, the switching control in the driver circuit 57 is stopped by cutting the first power circuit 53 using the stoppage circuit 67. However, the switching control may be stopped by transmitting a stop instruction from the stoppage circuit 67 to the driver circuit 57.

What is claimed is:

1. A power supply system, comprising:
    a switching power source comprising:
        a transformer;
        a semiconductor switching element that is provided at a primary side of the transformer;
        a rectifying-and-smoothing circuit that is provided at a secondary side of the transformer;
        a switching controller configured to perform a switching control to turn on-and-off the semiconductor switching element, the switching controller being configured to start the switching control in response to receiving power from an AC power source,
        wherein the switching controller comprises:
            a stoppage circuit configured to perform a stoppage process to stop the switching control when a first-level control signal, which is associated with a first level, is input;
            a restart circuit configured to restart the switching control when a second-level control signal, which is associated with a second level and is different in its level from the first-level control signal, is input; and
            a limiting circuit configured to limit, when the limiting circuit is started in response to receiving power from the AC power source, a performance of the stoppage process performed by the stoppage circuit;
        a control device configured to start up in response to receiving power from the AC power source and to output one of a first switching signal to switch a control signal input into the switching controller to the first-level control signal and a second switching signal to switch the control signal input into the switching controller to the second-level control signal,
            wherein, during start-up of the control device, the control device outputs the first switching signal, and
            wherein, after the control device is started up, the limiting circuit releases a limitation of the performance of the stoppage process.

2. The power supply system according to claim 1,
    wherein the switching controller includes a control input port, and
    wherein a level signal according to a voltage of the control input port, as the control signal, is input to the stoppage circuit and the restart circuit.

3. The power supply system according to claim 2,
    wherein the limiting circuit detects a switching of a voltage of the control input port and then releases a limitation on the performance of the stoppage process.

4. The power supply system according to claim 1,
    wherein the limiting circuit comprises:
        a gate circuit configured to switch whether the control signal is to be input to the stoppage circuit; and
        a gate control circuit configured to control the gate circuit,
        wherein the gate control circuit controls the gate circuit so that an input of the control signal to the stoppage circuit is limited until the output voltage of the switching power source is increased to a target voltage, which is larger than an operating voltage where the controller is operable, and
        wherein the gate control circuit controls the gate circuit so that an input of the control signal to the stoppage circuit is allowed after the output voltage of the switching power source reaches the target voltage.

5. The power supply system according to claim 4, further comprising:
    a voltage generating circuit configured to generate a power-supply voltage of the switching controller, wherein an output voltage of the voltage generating circuit is reached to a reference value at a time after the output voltage of the switching power source is increased to the target voltage; and
    a signal output unit configured to output a timing signal to the gate control circuit when the output voltage of the voltage generating circuit is compared with the reference value and the output voltage of the voltage generating circuit is reached to the reference value,
    wherein the gate control circuit outputs an instruction to limit an input of the control signal to the gate circuit until a timing signal is input from the signal output unit after a start-up of the gate control circuit, and
    wherein the gate control circuit outputs an instruction to allow the input of the control signal to the gate circuit when the timing signal is input from the signal output unit.

6. The power supply system according to claim 4, further comprising:
    a timer configured to count a required time that is necessary for the output voltage of the switching power source to be increased to the target voltage, wherein the gate control circuit controls the gate circuit so that an input of the control signal to the stoppage circuit is limited while the timer counts the required time, and
    wherein the gate control circuit controls the gate circuit so that the input of the control signal to the stoppage circuit is allowed after the timer ends counting of the required time.

7. The power supply system according to claim 1,
    wherein the switching controller comprises;
        a driver circuit configured to perform the switching control;
        a first power circuit, which functions as a power source of the driver circuit;
        a start circuit configured to be operated by receiving power from the AC power source and to cause the first power circuit to start up; and
        a second power circuit configured to receive power from the AC power source side and to supply power to the limiting circuit, wherein the stoppage circuit stops the first power circuit when the first-level signal as the control signal is input, thereby performing the stoppage process, and wherein the restart circuit restarts the first power circuit by operating the start circuit when the second-level signal as the control signal is input, thereby restarting the switching control in the driver circuit.

8. A power-supply system according to claim 1, wherein the control device transmits:
   the second switching signal to the switching controller to switch a level of the control signal into the second level, thereby switching a mode of the switching power source into an output mode that is in an output state, in which the switching controller performs the switching control; and
   the first switching signal to the switching controller to switch the level of the control signal into the first level, thereby switching the mode of the switching power source into an output stop mode that is in an output stop state, in which the switching controller stops the switching control.

9. The power-supply system according to claim 8, wherein the switching power source comprises a switching circuit that switches a voltage of a control input port in response to the switching signal output from the control device, wherein the switching circuit comprises:
   a light receiving element, one side of which is connected to the control input port and the other side of which is connected to a second-level potential; and
   a light emitting diode configured to emit light in response to the switching signal to cause the light receiving element be conducted, wherein, in case that the light emitting diode is turned off in response to the first switching signal, the switching power source shifts to the output stop mode when the control signal is shifted to the first-level and a voltage of the control input port becomes the first-level, wherein, in case that the light emitting diode is turned on in response to the second switching signal, the switching power source shifts to the output mode when the control signal is shifted to the second-level and the voltage of the control input port becomes the second-level, and wherein the control device outputs the second switching signal that turns on the light emitting diode immediately after a start-up of the control device in response to receiving power from the switching power source.

10. The power-supply system according to claim 8, wherein the control device comprises a power storage unit, which is charged by the output of the switching power source and serves as a power source of the control device in the output stop mode.

11. An image forming apparatus, comprising:

a printing unit configured to perform a printing process; and the power-supply system according to claim 8, wherein, in the output mode, power is supplied from the switching power source of the power-supply system to the printing unit, and wherein, in the output stop mode, power supply is stopped from the switching power source of the power-supply system to the printing unit.

12. The power-supply system according to claim 1, wherein the first-level control signal is a high-level control signal, wherein the second-level control signal is a low-level control signal, which is lower than the first-level control signal, wherein the first switching signal is a low-level switching signal, and wherein the second switching signal is a high-level switching signal, which is higher than the first-level switching signal.

13. The power-supply system according to claim 7, wherein the stoppage circuit receives power from the second power circuit.

14. A switching power source, comprising:

a transformer;

a semiconductor switching element that is provided at a primary side of the transformer;

a rectifying-and-smoothing circuit that is provided at a secondary side of the transformer;

a switching controller configured to perform a switching control to turn on-and-off the semiconductor switching element, wherein the switching controller comprises:
   a stoppage circuit configured to perform a stoppage process to stop the switching control when a first-level control signal is input,
   a restart circuit configured to restart the switching control when a second-level control signal different in its level from the first-level control signal is input,
   a limiting circuit configured to limit, at the time of a start-up of the switching power source, a performance of the stoppage process performed by the stoppage circuit until an output voltage of the switching power source increases to a target voltage,
   a timer configured to count a required time that is necessary for the output voltage of the switching power source to be increased to the target voltage,
   the limiting circuit comprises:
      a gate circuit configured to switch whether the control signal is to be input to the stoppage circuit; and
      a gate control circuit configured to control the gate circuit,
      wherein the gate control circuit controls the gate circuit so that an input of the control signal to the stoppage circuit is limited while the timer counts the required time, and
      wherein the gate control circuit controls the gate circuit so that the input of the control signal to the stoppage circuit is allowed after the timer ends counting of the required time.

* * * * *